3,095,423
SYNTHESIS OF 2-PYRROLIDINONE
John W. Copenhaver, North Oaks, and William O. Ney, Jr., Lincoln Township, Washington County, Minn., assignors to Minnesota Mining and Manufacturing Company, St. Paul, Minn., a corporation of Delaware
No Drawing. Filed Feb. 1, 1961, Ser. No. 86,284
4 Claims. (Cl. 260—326.5)

This invention relates to a new process for the synthesis of 2-pyrrolidinone and particularly to a process for producing 2-pyrrolidinone from succinonitrile.

Polymers formed from 2-pyrrolidinone, commonly hereinafter referred to as pyrrolidone, are known to have desirable properties. While a number of processes are available for the synthesis of pyrrolidone, for example, either from acetylene through the Reppe synthesis or from butyrolactone obtained from wood tar, it has not heretofore been known that pyrrolidone can be obtained from succinonitrile, which is a by-product of the production of acrylonitrile.

A principal object of this invention is to provide a useful process for the preparation of pyrrolidone. A further object of the invention is to produce pyrrolidone from by-product materials. A still further object of the invention is to produce pyrrolidone from succinonitrile. Other objects will become apparent from the disclosure hereinafter made.

In accordance with these and other objects of the invention it has been found that pyrrolidone is readily obtained from succinonitrile by a composite process apparently involving simultaneous hydration, hydrogenation, and deamidification by cyclization. The overall reaction may be represented in equation form as follows:

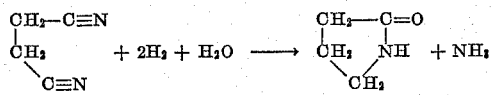

It will be seen that this involves the formal steps of hydrolyzing one nitrile group to an amide, reducing the other to a primary amine and cyclizing by splitting out ammonia between the amide and amine groups. No precedent is known for this remarkable concatenation of events. In one previous process described by McKeever, United States Patent Number 2,843,600, an alkyl beta-cyanopropionate is apparently reduced catalytically to the gamma-amino butyrate which then undergoes cyclization by splitting out the alkanol between the ester and amine groups. This reaction is much more straightforward than that of the present invention which appears to require simultaneous occurrence of three reactions rather than only two.

The process of this invention is carried out employing an aqueous milieu, a catalyst and hydrogen under elevated pressures and temperatures.

Succinonitrile is a water-soluble by-product obtained in the production of acrylonitrile. Employing aqueous ammonia in the reaction mixture is advantageous, as it may be that under these conditions some ammonlysis of one nitrile group assists in the hydrolysis by the formation of an amidine group. The presence of ammonia also suppresses the formation of secondary amines. In any event, it is found desirable to employ aqueous ammonia containing about 2 to 15 percent by weight of ammonia as the vehicle for the reaction.

The catalyst which is employed is chosen from the group of hydrogenation catalysts adaptable to hydrogenations at pH values above about 8, for example, ruthenium oxide, platinum oxide, supported noble metal catalysts such as platinum and palladium on carbon or alumina, Raney nickel, Raney cobalt and the like. The catalysts are employed in the normal proportions of about 0.1 to 5 percent by weight for the noble metals and about 0.5 to 10 percent for catalysts of other types such as nickel and cobalt, based on the amount of succinonitrile used. The catalysts may be recovered by filtration or decantation and can be employed repeatedly if not deactivated by impurities present in the reaction mixture.

The hydrogen employed is of the type normally used for hydrogenations and is substantially free from oxygen. When oxidizible catalysts, e.g. nickel, are used, prepurification of the hydrogen is desirable. When the reaction is effected in an autoclave, a continuous source of hydrogen is provided at a pressure such that the pressure in the autoclave can be brought up to and maintained at about 1000 to 2000 p.s.i. as hydrogen is consumed. On a larger scale pumping means are provided so that a pressure in this range can be reached. While the reaction can occur at pressures of about 500 p.s.i. it is not quite so desirable and at lower pressures the rate becomes slower and uneconomic. Pressures above 2000 p.s.i. can be employed in equipment properly designed to withstand these higher pressures, which require much heavier wall thicknesses and other such features.

The temperature at which the reaction takes place may range from about 20° to about 200° C. A very suitable range is from about 80° to 160° C., within which range the reaction proceeds very smoothly with rapid uptake of hydrogen.

After uptake of hydrogen has ceased as shown by the failure of the pressure to drop on further agitation, the reaction mixture is cooled and discharged. The catalyst is recovered by filtration. The 2-pyrrolidone produced is recovered by fractional distillation.

Having described the process of the invention in general terms it is now more specifically illustrated by an example which shows the best mode presently contemplated of practicing the invention. All parts are by weight unless otherwise specified.

A mechanically agitated stainless steel autoclave having suitable capacity, fitted with heating means, and provided with a removable cover with a pipe connection for introduction of gas and with manometric attachments and a thermocouple well, is charged with 80 parts of succinonitrile, 20 parts of 28% aqueous ammonium hydroxide, 80 parts of distilled water and 2 parts of ruthenium oxide. The cover is attached and locked in place. Connection is made to a conventional hydrogenation manifolding system and the autoclave is filled with hydrogen to about 100 p.s.i. and flushed out three times by bleeding out the gas and hydrogen is then introduced to 1200 p.s.i. Shaking is started and the autoclave is heated to about 150° C. The connection to the hydrogen source is cut off by a valve so that the combined effects of increasing pressure due to heating and decreasing pressure due to reaction are indicated by the manometric means (which is conveniently a Bourdon gauge).

The pressure starts to drop almost as soon as heating is started and more hydrogen is introduced to return the pressure to about 1200 p.s.i as often as it drops to about 500 p.s.i., since at lower pressures the reaction is slower than desired, inasmuch as a large part of this pressure is due to the vapor pressures of succinonitrile, water and ammonia. It will be evident that the gas capacity over the reaction mixture is such that even at 1200 p.s.i. only a fraction of the total of about 4 parts of hydrogen required will be present at one time. This replenishment of the hydrogen is repeated until there is no further decrease in pressure, or at least the rate of uptake of hydrogen is so low as to indicate that the reaction is substantially completed.

During the course of the reaction the temperature is maintained at about 150° C. by heating if required and after about 1 hour the rate of uptake is found to be so slow as to indicate that further addition of hydrogen would require an excessive time. The autoclave is cooled by allowing it to stand, the excess hydrogen is bled to the outside through the manifold and the autoclave is flushed once with nitrogen as a standard safety precaution for hydrogenation. The reaction mixture which is now homogeneous except for the catalyst is removed, the autoclave rinsed with water and the whole then filtered. The filtrate is distilled to remove water. Fractional distillation of the remaining liquid at about 10 mm. Hg provides a small forerun and a main fraction which distills at about 113° to 114° C. at 9.2 mm. Hg pressure and is identified as 2-pyrrolidinone by the characteristic absorption maximum in its infra-red absorption spectrogram. The yield is about 25% of theoretical when small runs are made. Larger runs and lowering the reaction temperature bring about substantial increases in the yield.

What is claimed is:

1. The process for the synthesis of 2-pyrrolidinone, which comprises catalytically hydrogenating and cyclizing succcinonitrile by heating in aqueous milieu at a temperature in the range of about 20° to 200° C. in the presence of a hydrogenation catalyst and hydrogen under a pressure of at least about 500 p.s.i.

2. The process for the synthesis of 2-pyrrolidinone which comprises heating succinonitrile at a temperature in the range of about 20° to 200° C. in an aqueous ammoniacal system in the presence of hydrogen at a pressure of from about 500 p.s.i. to about 2000 p.s.i and a hydrogenation catalyst.

3. The process for the production of 2-pyrrolidinone, which comprises heating succinonitrile at a temperature in the range of about 20° to 200° C. in an aqueous ammoniacal system in the presence of a hydrogenation catalyst operative at hydrogen ion concentrations above about pH 8 and hydrogen under a pressure of at least about 500 p.s.i.

4. The process for the production of 2-pyrrolidone, which consists essentially of heating succinonitrile at a temperature in the range of about 20° to 200° C. in an ammoniacal aqueous milieu containing approximately 2 to 15 percent by weight of ammonia in water in the presence of a hydrogenation catalyst and hydrogen under a presure of from about 500 p.s.i. to about 2000 p.s.i.

References Cited in the file of this patent

UNITED STATES PATENTS

| | | |
|---|---|---|
| 2,187,745 | Lazier | Jan. 23, 1940 |
| 2,806,037 | Miller | Sept. 10, 1957 |
| 2,857,398 | Miller et al. | Oct. 21, 1958 |